(12) United States Patent
Stoffel

(10) Patent No.: US 7,249,549 B2
(45) Date of Patent: Jul. 31, 2007

(54) ZERO-CLEARANCE TABLE SAW INSERT

(76) Inventor: Thomas Stoffel, 2077 170th La. NW., Andover, MN (US) 55304

( * ) Notice: Subject to any disclaimer, the term of this patent is extended or adjusted under 35 U.S.C. 154(b) by 203 days.

(21) Appl. No.: 10/780,221

(22) Filed: Feb. 17, 2004

(65) Prior Publication Data

US 2004/0159200 A1    Aug. 19, 2004

Related U.S. Application Data

(60) Provisional application No. 60/448,074, filed on Feb. 18, 2003.

(51) Int. Cl.
  *B23D 45/06* (2006.01)
  *B27B 5/22* (2006.01)
  *B27B 5/29* (2006.01)
(52) U.S. Cl. ............... 83/477.2; 83/477.1; 144/286.1
(58) Field of Classification Search ............. 83/471, 83/471.2, 477, 477.1, 477.2, 594, 595; 144/286.1, 144/286.5, 1.1; 269/309
See application file for complete search history.

(56) References Cited

U.S. PATENT DOCUMENTS

| | | | |
|---|---|---|---|
| 1,313,107 A * | 8/1919 | Niewinski | ............. 83/477.2 |
| 2,008,673 A | 7/1935 | Ocenasek | |
| 2,020,222 A | 11/1935 | Tautz | |
| 2,106,288 A | 1/1938 | Tautz | |
| 2,615,479 A | 10/1952 | Bearup | |
| 2,709,463 A | 5/1955 | Gustin | |
| 2,750,970 A * | 6/1956 | Gaskell | ............. 83/478 |

(Continued)

OTHER PUBLICATIONS

Tage Frid Teaches Woodworking, Joinery: Tools and Techniques, The Taunton Press, Inc., © 1979, pp. 24 and 85.

(Continued)

*Primary Examiner*—Clark F. Dexter
(74) *Attorney, Agent, or Firm*—Alan Kamrath; Kamrath & Associates, PA

(57) ABSTRACT

A table saw insert (10) includes an annular table insert portion (22) formed of machinable aluminum and a kerf insert portion (20) received in a stepped passage (44) formed in the table insert portion (22). Holding screws (56) extend through counterbored openings (54) in the kerf insert portion (20) and are threadably received in lips (46) of the table insert portion (22). Set screws (52) are threadably received in the lips (46) on diametrically opposite sides of the holding screws (56) to adjust the upper surface of the kerf insert portion (20) to be planar with the upper surface of the table insert portion (22). Ball plungers (30) are located in plunger openings (36) extending from the outer periphery of the table insert portion (22) to remove side-to-side play of the insert (10) within the table opening (12).

20 Claims, 5 Drawing Sheets

U.S. PATENT DOCUMENTS

| | | | |
|---|---|---|---|
| 2,964,075 A | | 12/1960 | Goldschmidt et al. |
| 3,269,433 A | | 8/1966 | Packard et al. |
| 3,285,303 A | | 11/1966 | Kwiatkowski |
| 3,289,713 A | | 12/1966 | Herzog |
| 3,386,482 A | | 6/1968 | Nadeau |
| 4,161,900 A | | 7/1979 | Mendelsohn |
| 4,483,573 A | | 11/1984 | Keller |
| 4,543,866 A | | 10/1985 | Maier et al. |
| 4,733,704 A | | 3/1988 | Wolff |
| 4,955,765 A | | 9/1990 | Laird |
| 5,159,864 A | | 11/1992 | Wedemeyer et al. |
| 5,398,740 A | * | 3/1995 | Miller .................... 144/286.1 |
| 5,497,816 A | * | 3/1996 | Darland .................... 144/287 |
| 5,970,835 A | * | 10/1999 | Kenyon et al. ............ 83/477.2 |
| 6,202,311 B1 | * | 3/2001 | Nickels, Jr. .................. 30/376 |
| 6,216,575 B1 | * | 4/2001 | Dils ........................ 83/522.17 |

OTHER PUBLICATIONS

The Complete Book of Stationary Power Tool Techniques, R.J. DeCristoforo, © 1985, pp. 2-3, 40-41; 45; 50.

Delta, Model 36-862 Zero-Clearance Table Saw Insert, Part No. 422-04-655-0036, May 3, 1998, pp. 1-4.

Woodworker's Supply, Inc., Jun. 2000 Catalog # 152, pp. 1-2, 200, 225 and 228.

* cited by examiner

ZERO-CLEARANCE TABLE SAW INSERT

CROSS REFERENCE

The present application claims the benefit of U.S. Provisional Appln. No. 60/448,074 filed on Feb. 18, 2003.

BACKGROUND

The present invention relates to a zero-clearance insert for the blade of table saws and particularly to zero-clearance table saw inserts which overcome the many deficiencies of conventional zero-clearance table saw inserts.

The advantages of a zero-clearance table saw insert are well known. In particular, with a zero-clearance table saw insert, there is no gap between the saw blade and the insert. Thus, a zero-clearance table saw insert will enable splinter-free cuts to be made in plywoods and chip-free cuts to be made in laminates for a fraction of the cost of a dedicated blade. Additionally, the workpiece being cut is supported everywhere but where it is being cut such that the corner of a workpiece can not extend below the saw upper surface and the like to reduce the possibility of jamming and/or kickback.

However, prior zero-clearance table saw inserts were often formed of a single piece of cutable material and thus were expensive, difficult to fabricate with a planar upper surface, difficult to prevent warpage after manufacture, and impossible to be leveled once installed and to minimize flexing during use. Although two piece zero-clearance table saw inserts have been provided, prior two piece zero-clearance table saw inserts secure the cutable portion by use of dovetail joints which increase the required size of the cutable portion, are difficult to fabricate, have no provisions or ability to adjust the upper surfaces of the metal and cutable portions, and are otherwise deficient.

Thus, a need exists for table saw inserts that overcome the problems and deficiencies of prior table saw inserts and especially zero-clearance table saw inserts.

SUMMARY

The present invention solves these needs and other problems in the field of table saw inserts by providing, in preferred aspects, a table insert portion adapted to be received in the blade opening of a table saw and formed of rigid and machinable material. A kerf insert portion is located in a passage formed in the table insert portion and is formed of cutable material. Thus, the table insert portion acts as the main carrier for the workpiece to be cut and the support for the kerf insert portion. The kerf insert portion is adjustably held in the passage such that the kerf insert portion can be adjusted relative to the table insert portion so that the upper surface of the kerf insert portion is planar with the upper surface of the table insert portion.

In preferred aspects of the present invention, the kerf insert portion abuts with an abutment surface of a lip extending from sides of the passage and is adjustably positioned in the passage by spacing the kerf insert portion from the abutment surface.

In a further aspect, first and second plungers are provided in one of the parallel sides of the periphery of a table saw insert, with the plungers each including a spring biased ball which engages with the corresponding side of the saw blade opening to automatically position the table saw insert in the same place in the saw blade opening and relative to the saw blade and to eliminate vibration and movement of the table saw insert in the saw blade opening.

Thus, the present invention provides a novel table saw insert.

Further, the present invention provides such a novel table saw insert which automatically positions itself in the same place in the saw blade opening and relative to the saw blade and to eliminate vibration and movement of the table saw insert in the saw blade opening.

Further, the present invention provides such a novel table saw insert of the zero-clearance type.

Further, the present invention provides such a novel zero-clearance table saw insert which minimizes the possibility and effect of warpage after manufacture.

Further, the present invention provides such a novel zero-clearance table saw insert which is relatively inexpensive to fabricate and replace.

Further, the present invention provides such a novel zero-clearance table saw insert having a main carrier portion with a machinable upper surface.

Further, the present invention provides such a novel zero-clearance table saw insert which can be adjusted to be leveled to be in the same plane as the upper table saw surface and maintained therein during use.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
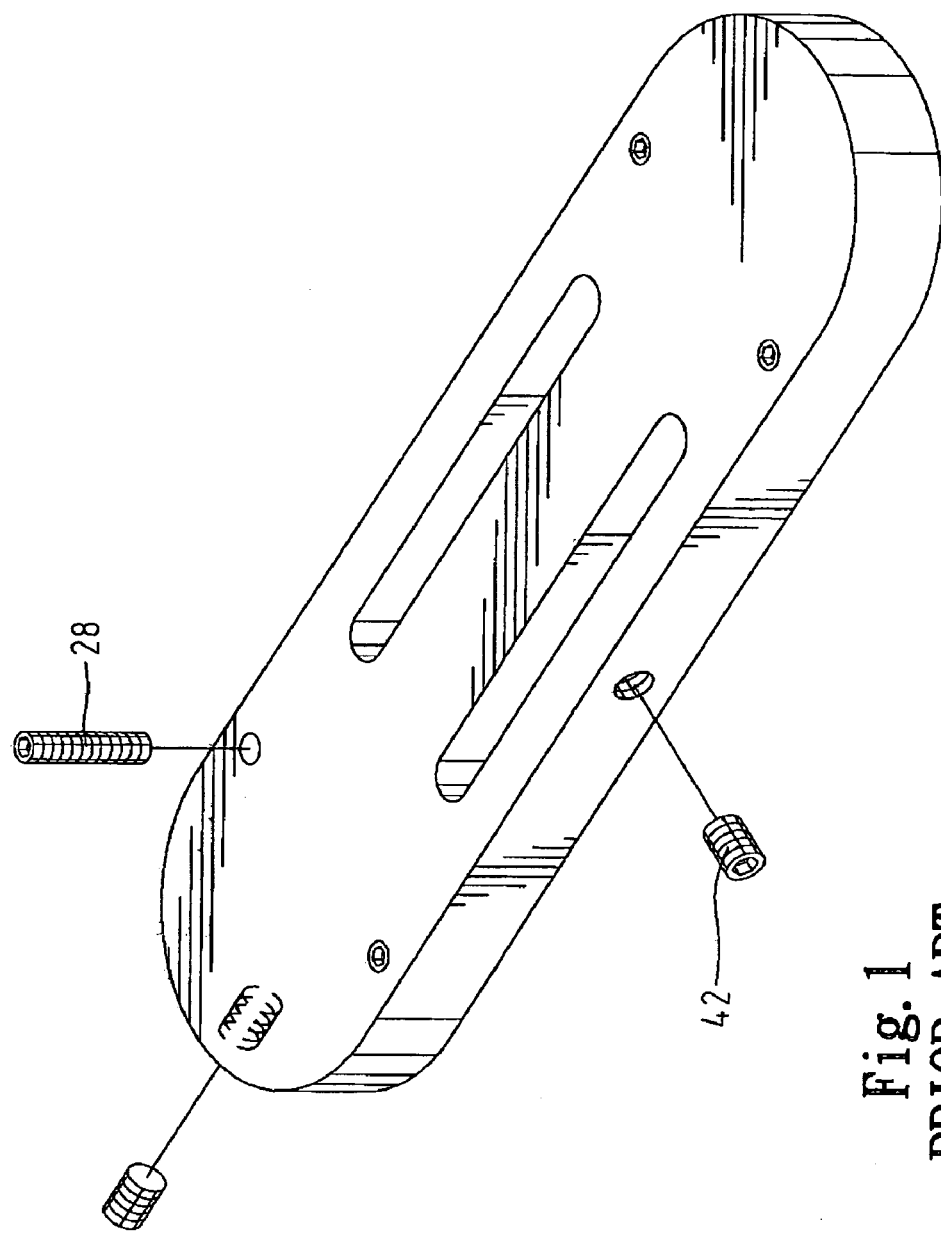
FIG. 1 shows an exploded perspective view of a conventional zero-clearance table saw insert.
Figure 2:
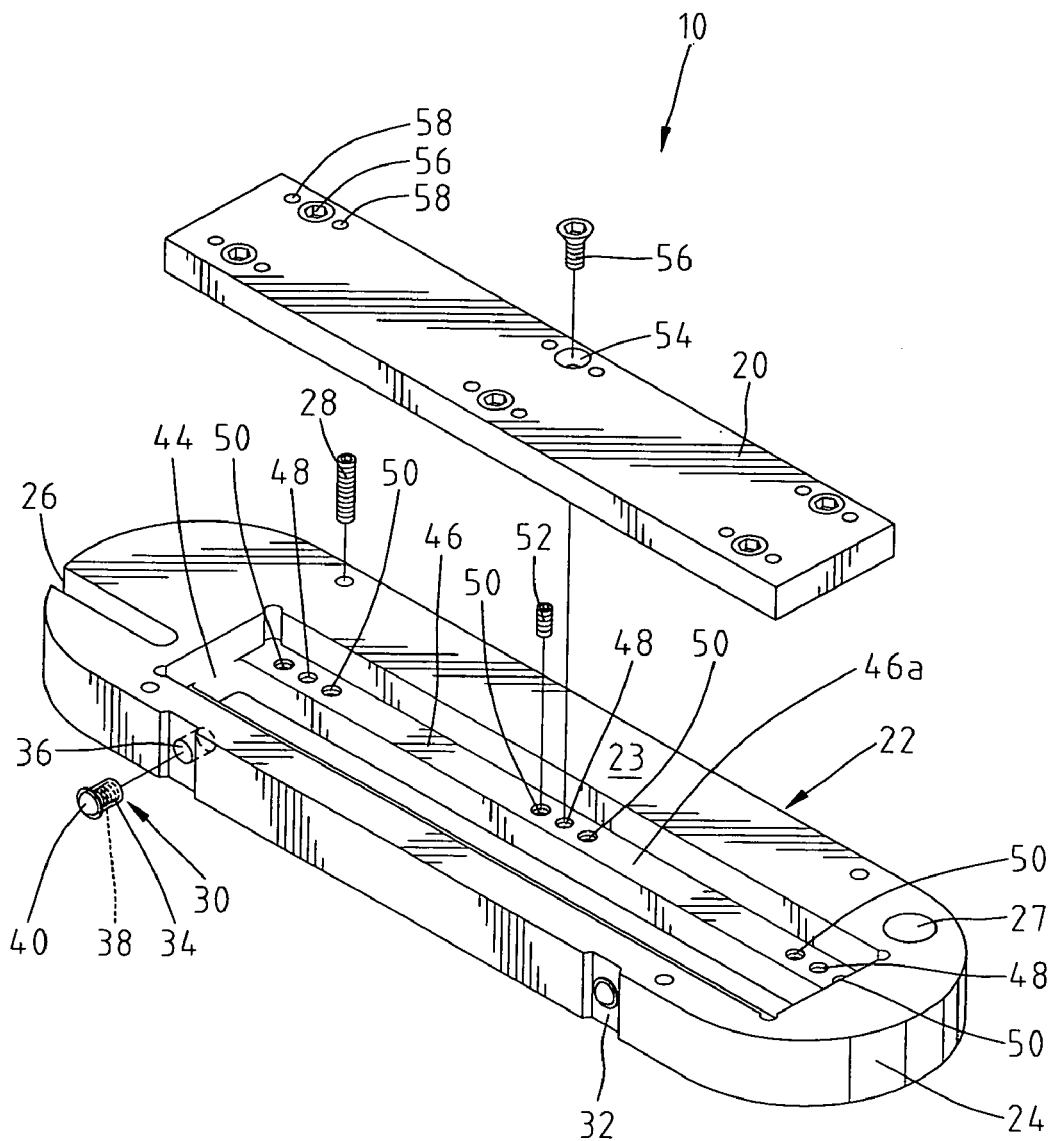
FIG. 2 shows an exploded perspective view of a zero-clearance table saw insert according to the preferred teachings of the present invention.
Figure 3:
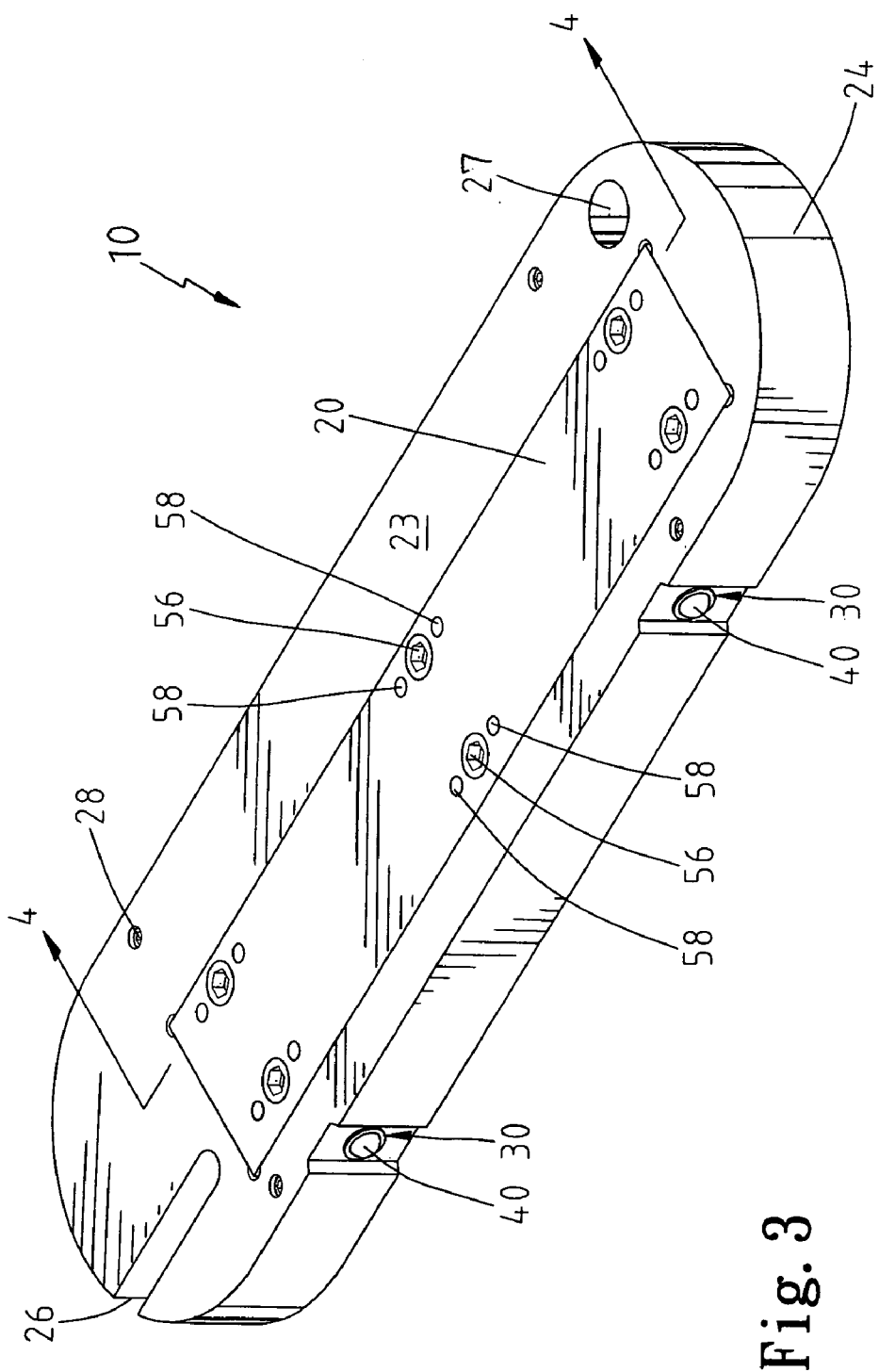
FIG. 3 shows a perspective view of the zero-clearance table saw insert of FIG. 1 in an assembled condition.
Figure 4:
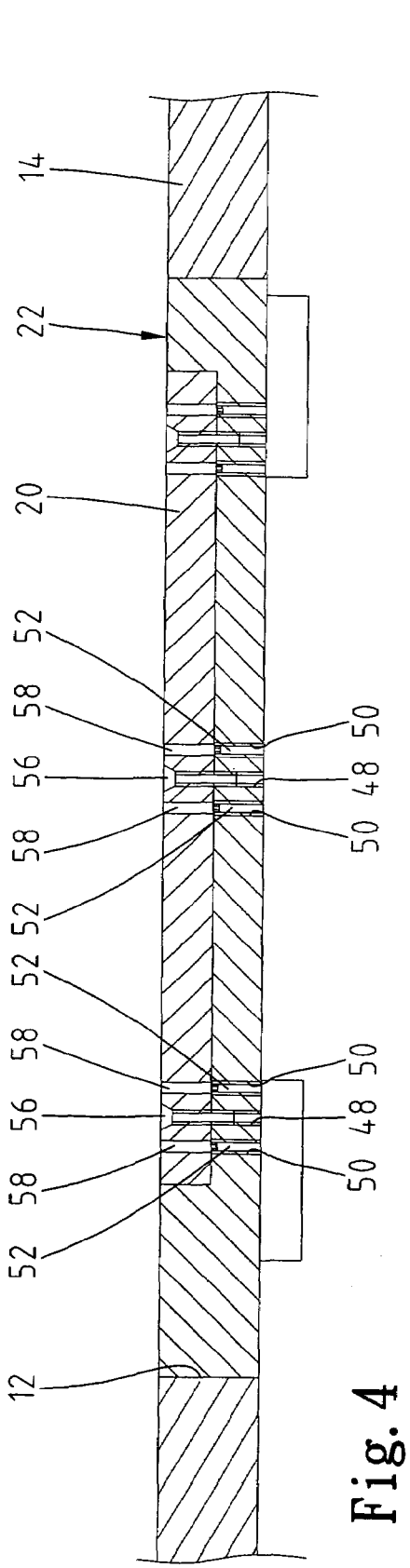
FIG. 4 shows a cross sectional view of the zero-clearance table saw insert of FIG. 1 according to section line 4—4 of FIG. 3.
Figure 5:
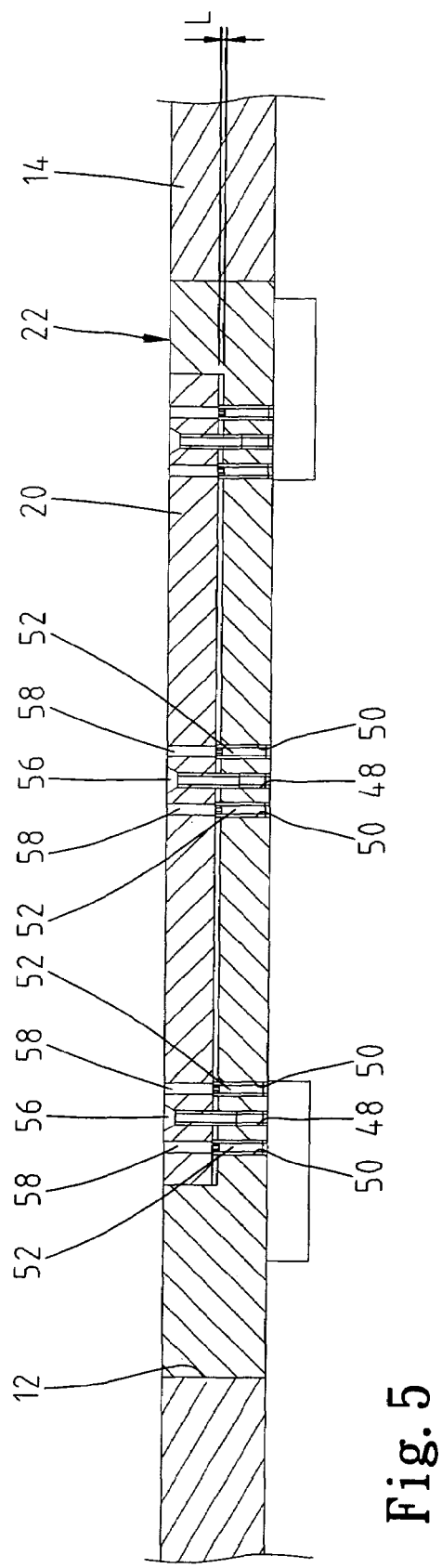
FIG. 5 shows a cross sectional view of the zero-clearance table saw insert of FIG. 1 similar to FIG. 4 but with the kerf insert portion being adjusted by the distance labeled L relative to the table saw insert portion.
Figure 6:
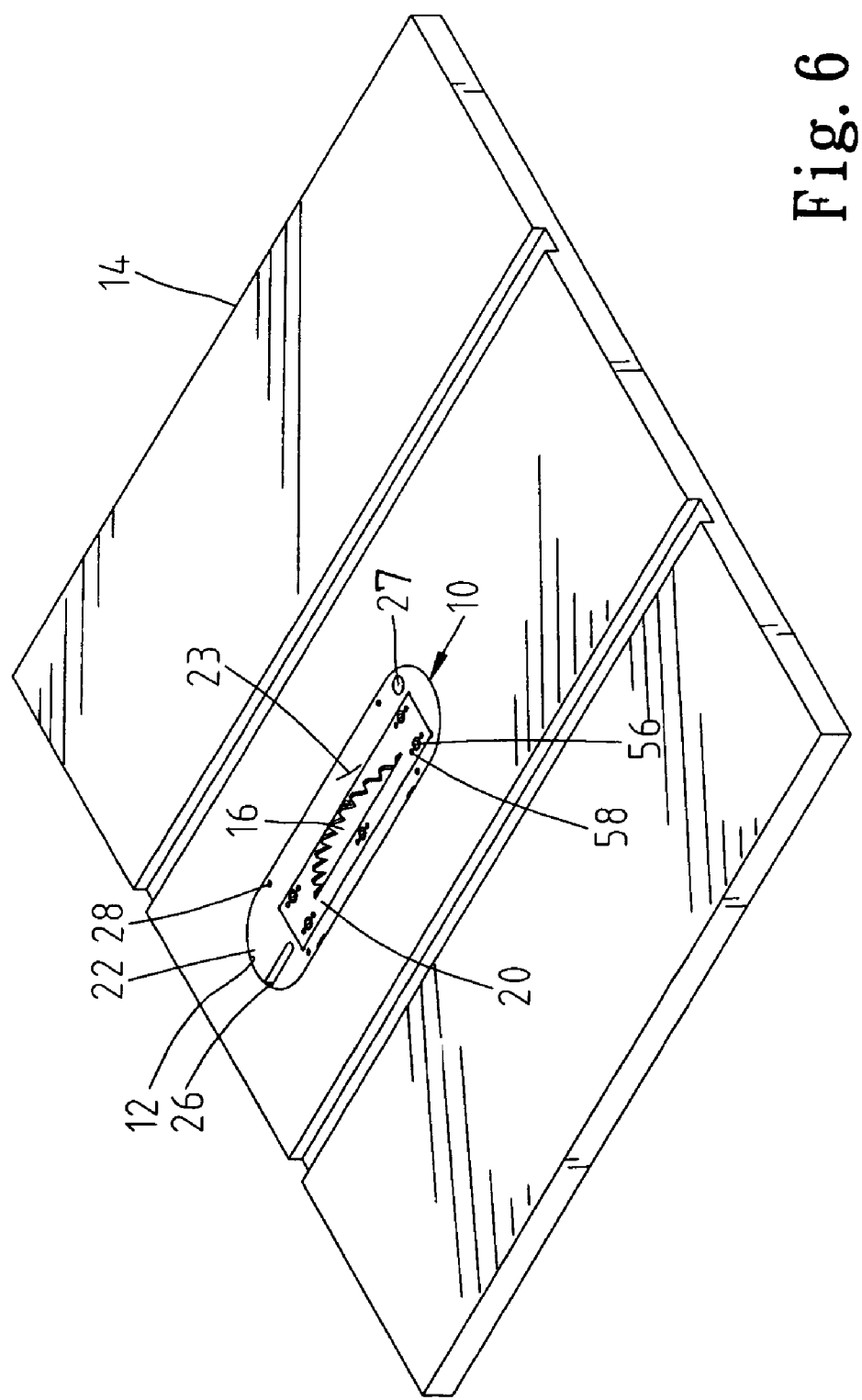
FIG. 6 shows a perspective view of the zero-clearance table saw insert of FIG. 1 in use in a table saw, with portions of the table saw being removed for ease of illustration.

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "side", "end", "bottom", "first", "second", "upper", "lower", "outside", and similar terms are used herein, it should be understood that these terms have reference only to the structure shown in the drawings as it would appear to a person viewing the drawings and are utilized only to facilitate describing the illustrative embodiment.

DESCRIPTION OF AN ILLUSTRATIVE EMBODIMENT

A zero-clearance table saw insert 10 according to the preferred teachings of the present invention is shown in the drawings and generally designated 10. In particular, insert 10 is intended to be received in an opening 12 of a conventional table saw 14, with table saw 14 having a saw blade 16 extending through opening 12. Opening 12 is generally of an elongated shape having parallel sides and semicylindrical ends. The rip fence, blade guard, and splitter assembly have been removed from table saw 14 shown for ease of illustration.

Insert 10 according to the preferred teachings of the present invention generally includes a kerf insert portion 20 received in a table insert portion 22. Table insert portion 22 is generally of an annular shape and is formed of rigid, thick aluminum that won't twist, warp or bend and which has a machined flat, upper surface 23. Portion 22 includes an outer periphery 24 of a shape corresponding to opening 12 and of a size slightly smaller than and for slideable receipt in opening 12. A first end of insert portion 22 may include an indexing pin, not shown, pointing toward the rear of saw 14, with the indexing pin having a conventional form. A slit 26 extends from outer periphery 24 of the first end of insert portion 22 and parallel to and spaced from the parallel sides of outer periphery 24. Slit 26 receives the blade guard for saw 14. The second end of insert portion 22 includes a finger hole 27 located toward the front of saw 14 to allow ease of removal of insert 10.

Four leveling screws 28, which are known in the prior art as shown in FIG. 1, are shown in the most preferred form of the present invention as set screws threadably received in insert portion 22 for adjusting insert portion 22 such that its top surface 23 is within the same plane of the top surface of table saw 14 around opening 12. It can be appreciated that adjustment of insert portion 22 can be accomplished by other manners which are conventional or will be known to persons skilled in the art.

First and second ball plungers 30 are located in first and second channels 32 in one of the parallel sides of outer periphery 24. In particular, ball plungers 30 each include a housing 34 of a size and shape for being press fit in openings 36 formed in periphery 24 inside of channels 32. A spring 38 biases a biased abutting element shown in its most preferred form as a spherical ball 40 inside of housing 34. Thus, ball 40 of each ball plunger 30 engages with the side of opening 12 to remove side-to-side play of insert portion 22 within opening 12. Although the use of ball plungers 30 is believed to be advantageous, side-to-side play of insert portion 22 can be removed such as by use of screws 42 (FIG. 1) threaded into the side of outer periphery 24 or by other manners which are conventional or will be known to a person skilled in the art.

Insert portion 22 further includes a stepped passage 44 extending from upper surface 23 through the lower surface and shown in the most preferred form as of being a rectangular parallelepiped shape. In the preferred form, first and second lips 46 extend from the opposite sides of passage 44 in a spaced, parallel relation. Lips 46 have a lower surface coextensive with the remaining portions of insert portion 22 and have a thickness generally equal to one-half the thickness between upper surface 23 and the lower surface.

In the preferred form shown, each lip 46 includes an abutment surface 46a, the abutment surface 46a having three threaded, securement openings 48 each located intermediate a pair of threaded, adjustment openings 50 extending in a spaced parallel relation relative to each other and to openings 48. Adjustment devices 52 shown in the preferred form as set screws are threadably received in each opening 50.

Kerf insert portion 20 is formed of cutable material such as a phenolic material which is durable and provides minimal resistance to blade 16 extending therethrough. Insert portion 20 has a shape and size adapted to fit in passage 44 and in the most preferred form above lips 46. Insert portion 20 includes six counterbored openings 54 corresponding to openings 48 and for rotatable receipt of holding screws 56 or other securement provisions, with screws 56 being threadably received in openings 48 in the most preferred form. Insert portion 20 further includes twelve access openings 58 corresponding to openings 50 and in particular set screws 52 threaded therein. In particular and in the preferred form, an allen wrench can be inserted through openings 58 and engaged with set screws 52 for purposes of threading set screws 52 into or out of lips 46.

In assembling insert 10 according to the teachings of the present invention, insert portion 20 is inserted in passage 44 and screws 56 are threaded into openings 48. Set screws 52 can be adjusted until the upper surface of insert portion 20 is planar with upper surface 23 of portion 22. Adjustment of screws 52 can be performed after insert 10 is inserted into opening 12. With blade 16 positioned below opening 12, assembled insert 10 can be inserted into opening 12 and adjusted as described previously, if necessary. After insertion of insert 10, blade 16 can be raised while rotating to cut through insert portion 20 and to the desired height above upper surface 23. In this regard, a clearance slot can be provided in insert portion 20 to allow ease of cutting by blade 16 through insert portion 20.

Now that the basic construction and use of insert 10 according to the preferred teachings of the present invention have been explained, some of the advantages of insert 10 can be set forth and appreciated. It should be appreciated that phenolic or like material is relatively expensive, and insert 10 according to the teachings of the present invention utilizes insert portion 20 which is of a size considerably smaller than and of a thickness less than opening 12 to minimize the material cost. Additionally, after wear, it is only necessary to replace insert portion 20 and not the whole insert 10, to thereby minimize replacement costs. Similarly, it is possible to utilize multiple insert portions 20 in a single portion 22 such as one insert portion 20 could be formed for a dado blade while other insert portions 20 could be utilized for standard blades 16 having differing vertical extents above upper surface 23.

Further, forming insert 10 from portions 20 and 22 allows the use of dissimilar materials and in particular portion 22 can be formed of rigid material that can not be hit by blade 16 while only portion 22 is formed of softer material which can be cut with blade 16. In particular, portion 22 forms the main carrier for the workpiece to be cut and is formed of material which has less tendency to warp and can be machined flat. Thus, insert 10 according to the teachings of the present invention is more accurate than prior zero-clearance table saw inserts formed of a single material.

Likewise, forming insert 10 from two portions 20 and 22 according to the teachings of the present invention allows portion 20 to be leveled in relation to upper surface 23 in the event that portion 20 becomes warped and/or could otherwise flex during use.

Additionally, plungers 30 automatically position insert 10 in the same place in opening 12 and relative to blade 16 and eliminates vibration and movement that causes an oversized kerf cut. Screw adjustments as was utilized prior to the present invention did not achieve this level of consistency and movement elimination. In this regard, plungers 30 according to the teachings of the present invention could be utilized in conventional table saw inserts not having zero-clearance capabilities as well as prior zero-clearance table saw inserts.

Now that the basic teachings of the present invention have been explained, many extensions and variations will be obvious to one having skill in the art. For example, insert portion 20 and passage 44 could have other shapes and sizes than as shown and described. Similarly, other manners of holding insert portion 20 relative to insert portion 22 may be possible according to the teachings of the present invention including but not limited to other manners of securement and/or adjustment.

Additionally, although openings 58 allow adjustment of screws 52 after insert 10 is inserted into opening 12, openings 58 can be eliminated from kerf insert portion 20 and set screws 52 reversed in lip 46 according to the teachings of the present invention. Although adjustment could not generally be performed with insert 10 in place, any problems of saw dust or the like collecting in openings 58 would be avoided.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. An insert received in a blade opening of a table of a cutting tool, with the insert comprising:
   a table insert portion having an outer periphery of a shape corresponding to the blade opening, with the table insert portion further including an upper surface and a lower surface, with the table insert portion having a passage extending from the upper surface through the lower surface;
   a kerf insert portion formed of cuttable material, with the kerf insert portion removably received in the passage, with the kerf insert portion having an upper surface, with the kerf insert portion being insertable into the passage by movement perpendicular to the upper surface of the table insert portion and the upper surface of the kerf insert portion; and
   adjustment structure to adjust the height of the upper surface of the kerf insert portion relative to the upper surface of the table insert portion so that the upper surface of the kerf insert portion is planar with the upper surface of the table insert portion.

2. The insert of claim 1 with the kerf insert portion being held to the table insert portion by holding screws threadably received in at least one of the kerf insert portion and the table insert portion.

3. The insert of claim 2 with the kerf insert portion including holding screw openings for rotatable receipt of the holding screws, with the table insert portion including threaded, securement openings for threadable receipt of the holding screws.

4. The insert of claim 3 with the passage being stepped and including a lip extending from sides of the passage, with the threaded, securement openings located in the lip within the passage.

5. The insert of claim 4 with the kerf insert portion further having a continuous lower surface parallel to the upper surface, with the kerf insert portion having a thickness between the upper and lower surfaces less than between the upper and lower surfaces of the table insert portion.

6. The insert of claim 4 with the lip having an abutment surface for abutting with the kerf insert portion received in the passage, with the adjustment structure spacing the kerf insert portion from the abutment surface.

7. The insert of claim 6 with the adjustment structure being mounted to the lip and abutting with the kerf insert portion adjacent to the holding screws.

8. The insert of claim 7 with the adjustment structure comprising at least one set screw threadably received in the lip adjacent each holding screw.

9. The insert of claim 7 with the adjustment structure comprising a pair of set screws threadably received in the lip on diametrically opposite sides of each holding screw.

10. The insert of claim 9 with the kerf insert portion including an access opening extending from the upper surface and aligned with each set screw.

11. The insert of claim 7 further comprising: a plurality of leveling screws threadably received in the table insert portion for adjusting the table insert portion such that the upper surface of the kerf insert portion is planar with an upper surface of the table.

12. The insert of claim 11 further comprising: first and second abutting elements; and first and second means for biasing the first and second abutting elements away from the outer periphery and adapted to engage the blade opening of the table.

13. The insert of claim 12 with first and second plunger openings formed in the outer periphery, with the first and second biasing means each comprising a spring, with each of the first and second plunger openings receiving one of the first and second abutting elements which sandwiches the spring inside the plunger opening.

14. The insert of claim 13 further comprising: a housing of a size and shape to be press fit in one of the first and second plunger openings, with the abutting element and the spring received in the housing.

15. The insert of claim 14 with the abutting elements being spherical balls.

16. The insert of claim 14 with the outer periphery including first and second channels extending between the upper and lower surfaces of the table insert portion, with the plunger openings located within the channels.

17. The insert of claim 3 with the holding screw openings being counterbored.

18. The insert of claim 1 with the passage being stepped and including a lip extending from sides of the passage, with the lip having an abutment surface for abutting with the kerf insert portion received in the passage, with the kerf insert portion being held by being attached to the lip, with the adjustment structure spacing the kerf insert portion from the abutment surface.

19. The insert of claim 18 with the adjustment structure being mounted to the lip and abutting with the kerf insert portion.

20. The insert of claim 19 with the adjustment structure comprising at least one set screw threadably received in the lip.

* * * * *